United States Patent
Lu et al.

(10) Patent No.: US 8,876,325 B2
(45) Date of Patent: Nov. 4, 2014

(54) REVERSE TOTAL INTERNAL REFLECTION FEATURES IN LINEAR PROFILE FOR LIGHTING APPLICATIONS

(75) Inventors: Dong Lu, Cary, NC (US); Paul Kenneth Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 208 days.

(21) Appl. No.: 13/175,377

(22) Filed: Jul. 1, 2011

(65) Prior Publication Data

US 2013/0003363 A1    Jan. 3, 2013

(51) Int. Cl.
| | | |
|---|---|---|
| *F21S 4/00* | (2006.01) | |
| *G02B 19/00* | (2006.01) | |
| *F21V 5/04* | (2006.01) | |
| *F21V 7/00* | (2006.01) | |
| *F21V 29/00* | (2006.01) | |
| *F21S 8/02* | (2006.01) | |
| *F21Y 103/00* | (2006.01) | |
| *F21Y 113/00* | (2006.01) | |
| *F21Y 101/02* | (2006.01) | |

(52) U.S. Cl.
CPC ............ *F21V 5/04* (2013.01); *F21V 29/2262* (2013.01); *G02B 19/0066* (2013.01); *F21V 29/2237* (2013.01); *F21S 8/026* (2013.01); *F21S 8/02* (2013.01); *F21Y 2103/003* (2013.01); *G02B 19/0028* (2013.01); *F21V 29/2218* (2013.01); *F21Y 2113/005* (2013.01); *F21Y 2101/02* (2013.01); *F21V 7/0091* (2013.01)
USPC ................. 362/223; 362/217.02; 362/249.02; 362/309

(58) Field of Classification Search
USPC .................. 362/97.1, 97.3, 151, 152, 217.01, 362/217.02, 223, 244–246, 249.01, 249.02, 362/249.16, 308, 309, 311.01, 311.02, 326, 362/335, 336, 540, 543–545, 551, 555, 565, 362/576, 800, 812; 359/707–712, 718, 719, 359/722; 257/E25.02, E33.072, E33.073; 385/146
See application file for complete search history.

(56) References Cited

U.S. PATENT DOCUMENTS

| | | | | |
|---|---|---|---|---|
| 2,356,654 A | * | 8/1944 | Cullman | 362/223 |
| 4,390,930 A | * | 6/1983 | Herst et al. | 362/224 |
| 4,630,180 A | * | 12/1986 | Muraki et al. | 362/223 |

(Continued)

FOREIGN PATENT DOCUMENTS

WO   WO 2011140353 A2   11/2011

OTHER PUBLICATIONS

U.S. Appl. No. 12/873,303, filed Aug. 31, 2010 to Edmond, et al.

*Primary Examiner* — Hargobind S Sawhney
(74) *Attorney, Agent, or Firm* — Koppel, Patrick, Heybl & Philpott

(57) ABSTRACT

An elongated lens profile having reverse total internal reflection (TIR) features that improve light extraction when the lens is used in conjunction with a plurality of light emitters. Solid state light emitters, such as LEDs, are arranged proximate to the elongated lens along a longitudinal axis of the lens body. The emitters, which may be grouped in clusters, emit toward a receiving surface of the lens. The receiving surface includes a plurality of reverse TIR features, also disposed along the longitudinal axis. These features may be defined by a series of recessed areas spaced along the longitudinal axis to correspond with the light emitters which can protrude into the negative space created by the recessed features. The recessed features may have more than one shape. The reverse TIR features improve light output uniformity, reducing hot spots along the lens, and improve output efficiency.

29 Claims, 5 Drawing Sheets

(56) References Cited

U.S. PATENT DOCUMENTS

| | | | |
|---|---|---|---|
| 5,471,372 A * | 11/1995 | Mamelson et al. | 362/92 |
| 5,526,190 A * | 6/1996 | Hubble et al. | 359/719 |
| 5,779,338 A * | 7/1998 | Ishikawa et al. | 362/625 |
| 5,823,663 A | 10/1998 | Bell et al. | 362/362 |
| 6,210,025 B1 | 4/2001 | Schmidt et al. | 362/362 |
| 6,517,219 B1 * | 2/2003 | Chen | 362/349 |
| 6,565,225 B2 * | 5/2003 | Mabuchi et al. | 362/610 |
| 6,679,621 B2 * | 1/2004 | West et al. | 362/327 |
| 7,049,761 B2 | 5/2006 | Timmermans et al. | 315/246 |
| 7,104,672 B2 * | 9/2006 | Zhang | 362/308 |
| 7,142,769 B2 * | 11/2006 | Hsieh et al. | 385/146 |
| 7,213,940 B1 | 5/2007 | Van De Ven et al. | 362/231 |
| 7,387,399 B2 * | 6/2008 | Noh et al. | 362/97.1 |
| 7,457,510 B2 * | 11/2008 | Lee et al. | 385/146 |
| 7,470,046 B2 * | 12/2008 | Kao et al. | 362/332 |
| 7,510,299 B2 | 3/2009 | Timmermans et al. | 362/225 |
| 7,618,157 B1 * | 11/2009 | Galvez et al. | 362/294 |
| 7,712,918 B2 | 5/2010 | Siemiet et al. | 362/241 |
| 7,722,220 B2 | 5/2010 | Van De Ven | 362/294 |
| 7,768,192 B2 | 8/2010 | Van De Ven et al. | 313/503 |
| 7,815,338 B2 | 10/2010 | Siemiet et al. | 362/218 |
| 7,942,558 B2 * | 5/2011 | Zweig et al. | 362/311.06 |
| 8,107,155 B2 * | 1/2012 | Bita et al. | 359/290 |
| 2007/0115670 A1 | 5/2007 | Roberts et al. | |
| 2007/0115671 A1 | 5/2007 | Roberts et al. | |
| 2009/0154156 A1 * | 6/2009 | Lo et al. | 362/234 |
| 2009/0213575 A1 * | 8/2009 | Blumel et al. | 362/97.3 |
| 2009/0225543 A1 | 9/2009 | Roberts et al. | |
| 2009/0323334 A1 | 12/2009 | Roberts et al. | |
| 2010/0220469 A1 * | 9/2010 | Ivey et al. | 362/218 |
| 2011/0031523 A1 * | 2/2011 | Ishii et al. | 257/98 |
| 2011/0141734 A1 * | 6/2011 | Li et al. | 362/235 |
| 2011/0199005 A1 * | 8/2011 | Bretschneider et al. | 315/152 |
| 2011/0199769 A1 | 8/2011 | Bretschneider et al. | |
| 2012/0002415 A1 * | 1/2012 | Nelson et al. | 362/235 |

\* cited by examiner

8mm Spacing
No Recessed
Features

5mm Spacing
No Recessed
Features

REVERSE TOTAL INTERNAL REFLECTION FEATURES IN LINEAR PROFILE FOR LIGHTING APPLICATIONS

BACKGROUND OF THE INVENTION

1. Field of the Invention

Embodiments of the invention relate to arrayed lighting applications and, more particularly, to linear lighting applications having reverse total internal reflection lens elements.

2. Description of the Related Art

Many modern lighting applications utilize arrays of light emitters, such as light emitting diodes (LEDs), to achieve a particular light output profile. Arrayed LED designs have become popular due to economies of size and efficiency. Lighting applications may include linear arrays, two-dimensional arrays, and even three-dimensional arrays. U.S. application Ser. No. 12/074,762, commonly assigned to CREE, INC., provides examples of some of these emitter arrays.

Emitter arrays have been used in lighting fixtures. U.S. application Ser. No. 12/873,303, commonly assigned to CREE, INC., discloses, inter alia, solid state emitter arrays used in troffer-style fixtures. Troffer-style fixtures are ubiquitous in commercial office and industrial spaces throughout the world. In many instances these troffers house elongated fluorescent light bulbs that span the length of the troffer. Troffers may be mounted to or suspended from ceilings. Often the troffer may be recessed into the ceiling, with the back side of the troffer protruding into the plenum area above the ceiling. Typically, elements of the troffer on the back side dissipate heat generated by the light source into the plenum where air can be circulated to facilitate the cooling mechanism. U.S. Pat. No. 5,823,663 to Bell, et al. and U.S. Pat. No. 6,210,025 to Schmidt, et al., are examples of typical troffer-style fixtures.

More recently, with the advent of the efficient solid state lighting sources, these troffers have been used with solid state light sources such as LEDs, for example. LEDs convert electric energy to light and generally comprise one or more active regions of semiconductor material interposed between oppositely doped semiconductor layers. When a bias is applied across the doped layers, holes and electrons are injected into the active region where they recombine to generate light. Light is produced in the active region and emitted from surfaces of the LED.

LEDs have certain characteristics that make them desirable for many lighting applications that were previously the realm of incandescent or fluorescent lights. Incandescent lights are very energy-inefficient light sources with approximately ninety percent of the electricity they consume being released as heat rather than light. Fluorescent light bulbs are more energy efficient than incandescent light bulbs by a factor of about 10, but are still relatively inefficient. LEDs by contrast, can emit the same luminous flux as incandescent and fluorescent lights using a fraction of the energy.

In addition, LEDs can have a significantly longer operational lifetime. Incandescent light bulbs have relatively short lifetimes, with some having a lifetime in the range of about 750-1000 hours. Fluorescent bulbs can also have lifetimes longer than incandescent bulbs such as in the range of approximately 10,000-20,000 hours, but provide less desirable color reproduction. In comparison, LEDs can have lifetimes between 50,000 and 70,000 hours. The increased efficiency and extended lifetime of LEDs is attractive to many lighting suppliers and have resulted in LED lights being used in place of conventional lighting in many different applications. It is predicted that further improvements will result in their general acceptance in more and more lighting applications. An increase in the adoption of LEDs in place of incandescent or fluorescent lighting would result in increased lighting efficiency and significant energy savings.

Other LED components or lamps have been developed that comprise an array of multiple LED packages mounted to a (PCB), substrate or submount. The array of LED packages can comprise groups of LED packages emitting different colors, and specular reflector systems to reflect light emitted by the LED chips. Some of these LED components are arranged to produce a white light combination of the light emitted by the different LED chips.

In order to generate a desired output color, it is sometimes necessary to mix colors of light which are more easily produced using common semiconductor systems. Of particular interest is the generation of white light for use in everyday lighting applications. Conventional LEDs cannot generate white light from their active layers; it must be produced from a combination of other colors. For example, blue emitting LEDs have been used to generate white light by surrounding the blue LED with a yellow phosphor, polymer or dye, with a typical phosphor being cerium-doped yttrium aluminum garnet (Ce:YAG). The surrounding phosphor material "down-converts" some of the blue light, changing it to yellow light. Some of the blue light passes through the phosphor without being changed while a substantial portion of the light is down-converted to yellow. The LED emits both blue and yellow light, which combine to yield white light.

In another known approach, light from a violet or ultraviolet emitting LED has been converted to white light by surrounding the LED with multicolor phosphors or dyes. Indeed, many other color combinations have been used to generate white light.

Because of the physical arrangement of the various source elements, multicolor sources often cast shadows with color separation and provide an output with poor color uniformity. For example, a source featuring blue and yellow emitters may appear to have a blue tint when viewed head on and a yellow tint when viewed from the side. Thus, one challenge associated with multicolor light sources is good spatial color mixing over the entire range of viewing angles. One known approach to the problem of color mixing is to use a diffuser to scatter light from the various sources.

Another known method to improve color mixing is to reflect or bounce the light off of several surfaces before it is emitted from the lamp. This has the effect of disassociating the emitted light from its initial emission angle. Uniformity typically improves with an increasing number of bounces, but each bounce has an associated optical loss. Some applications use intermediate diffusion mechanisms (e.g., formed diffusers and textured lenses) to mix the various colors of light. Many of these devices are lossy and, thus, improve the color uniformity at the expense of the optical efficiency of the device.

Many current luminaire designs utilize forward-facing LED components with a specular reflector disposed behind the LEDs. One design challenge associated with multi-source luminaires is blending the light from LED sources within the luminaire so that the individual sources are not visible to an observer. Heavily diffusive elements are also used to mix the color spectra from the various sources to achieve a uniform output color profile. To blend the sources and aid in color mixing, heavily diffusive exit windows have been used. However, transmission through such heavily diffusive materials causes significant optical loss.

Some recent designs have incorporated an indirect lighting scheme in which the LEDs or other sources are aimed in a direction other than the intended emission direction. This may be done to encourage the light to interact with internal elements, such as diffusers, for example. One example of an indirect fixture can be found in U.S. Pat. No. 7,722,220 to Van de Ven which is commonly assigned with the present application to CREE, INC.

SUMMARY OF THE INVENTION

An embodiment of a lens according to the present invention comprises the following elements. An elongated body has at least one receiving surface and at least one emission surface. At least one recessed feature is disposed on the receiving surface along a longitudinal axis of the body.

A light emitting unit according to an embodiment of the present invention comprises the following elements. A plurality of light emitters is arranged proximate to an elongated lens. The elongated lens comprises at least one receiving surface and at least one emission surface, the elongated lens having a plurality of recessed features disposed on the receiving surface along a longitudinal axis of the lens such that each of the light emitters is aligned with one of the recessed features.

A lighting unit according to an embodiment of the present invention comprises the following elements. A troffer-style fixture is provided. An elongated lens body comprises at least one receiving surface and at least one emission surface. At least one recessed feature is disposed on the receiving surface along a longitudinal axis of the body. A plurality of light emitters is arranged proximate to the lens body such that each of the light emitters is aligned with one of the recessed features.

DETAILED DESCRIPTION OF THE INVENTION

Figure 1:
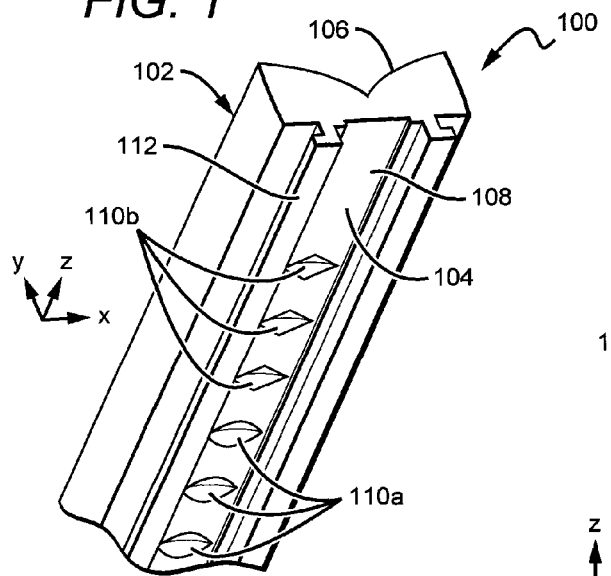
FIG. 1 is a perspective view of a portion of a lens 100 according to an embodiment of the present invention.

Embodiments of the present invention provide an elongated lens profile having reverse total internal reflection (TIR) features that improve light extraction when the lens is used in conjunction with a plurality of light emitters. Solid state light emitters, such as LEDs, are arranged proximate to the elongated lens along a longitudinal axis of the lens body. The emitters, which may be grouped in clusters, emit toward a receiving surface of the lens. The receiving surface includes a plurality of reverse TIR features, also disposed along the longitudinal axis. These features may be defined by a series of recessed areas spaced along the longitudinal axis to correspond with the light emitters which can protrude into the negative space created by the recessed features. The recessed features may have more than one shape. In one embodiment, a first type of recessed feature is placed directly over each light emitter to couple the output light into the lens, and a second type of recessed feature is placed between consecutive emitter clusters to reflect light travelling along the longitudinal direction (i.e., light that would be lost in the emitter tunnel) back into the lens structure for useful emission. Thus, the reverse TIR features improve light output uniformity, reducing hot spots along the lens, and improve output efficiency.

It is understood that when an element is referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one element to another. It is understood that these terms are intended to encompass different orientations of the device in addition to the orientation depicted in the figures.

Although the ordinal terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present invention.

As used herein, the term "source" can be used to indicate a single light emitter or more than one light emitter functioning as a single source. For example, the term may be used to describe a single blue LED, or it may be used to describe a red LED and a green LED in proximity emitting as a single source. Thus, the term "source" should not be construed as a limitation indicating either a single-element or a multi-element configuration unless clearly stated otherwise.

The term "color" as used herein with reference to light is meant to describe light having a characteristic average wavelength; it is not meant to limit the light to a single wavelength. Thus, light of a particular color (e.g., green, red, blue, yellow, etc.) includes a range of wavelengths that are grouped around a particular average wavelength. Furthermore, the term "color" is meant to include wavelengths outside the visible spectrum, such as ultraviolet and infrared wavelengths, for example.

FIG. 1 is a perspective view of a portion of a lens 100 according to an embodiment of the present invention. The lens 100 comprises an elongated body 102 which can be molded or extruded to achieve the desired profile. The lens 100 comprises at least one receiving surface, such as receiving surface 104, and at least one emission surface, such as emission surface 106. A plurality of light emitters (not shown) may be disposed proximate to receiving surface 104 within a tunnel 108. The tunnel 108 is shaped to accommodate a light strip (not shown), which may comprise a plurality of LEDs on printed circuit board (PCB). The receiving surface 104 comprises a plurality of recessed features 110 arranged along the longitudinal z-axis, some of which are designed to cooperate with light emitters positioned in the tunnel 108. Mounting flanges 112 may be used to mount the lens 100 to another body such as a heat sink, for example, using either an adhesive or a mechanical mounting means.

In this embodiment, the recessed features 110 comprise a first type 110a and a second type 110b. The first type recessed features 110a have a shape defined by a cross-section in the y-z-plane with two rounded edges that meet at a vertex. The second type recessed features 110b have a shape defined by a cross-section in the y-z-plane that is triangular. The first and second type recessed features 110a, 110b perform different functions as discussed in more detail herein. In this embodiment, the recessed features 110 are spaced at even intervals along the longitudinal z-axis of the lens body 102. The recessed features may also be spaced at uneven intervals. This particular embodiment features a cluster of three first type recessed features 110a buttressed on both sides by a cluster of three second type recessed features 110b. In other embodiments, the recessed feature clusters can comprise more or fewer of each type.

The lens body 102 may be constructed from many different materials that are transparent or translucent over the desired spectrum. According to Snell's Law, materials having a higher refractive index will result in a lower critical angle at boundaries with a medium having a lower index of refraction. For example, the critical angle for a polycarbonate (PC) or poly(methyl methacrylate) (PMMA) lens where n=1.8 would be 33.75°; for n=2.0, the critical angle would be 30.0°. Some lens materials that may be used include various polymeric materials such as PMMAs, PCs, cyclic olyphan copolymers (COC), or various types of glass. Other materials may also be used.

Figure 2:
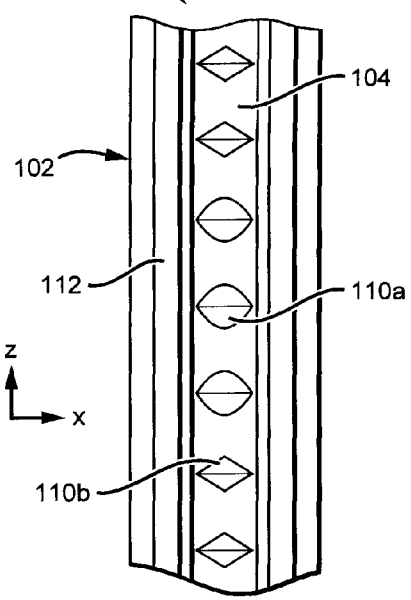
FIG. 2 is a bottom plan view of a lens according to an embodiment of the present invention.

FIG. 2 shows a bottom plan view of the lens 100. As shown, the recessed features 110a, 110b create a negative space designed to accommodate one or more light emitters in each. In this embodiment, the recessed features are designed to house a single emitter, such as an LED. The first and second type recessed features 110a, 110b have the cross-sections as described above with the depth increasing moving away from the sides toward the center of the recess.

Figure 3:
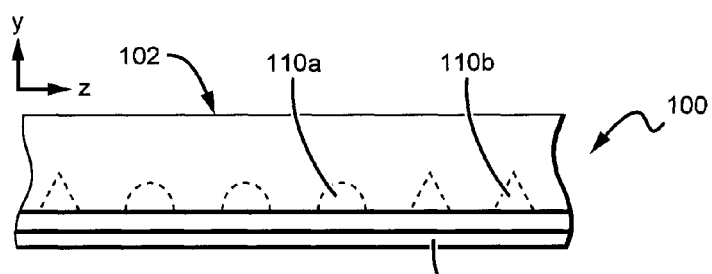
FIG. 3 is a side plan view of a lens according to an embodiment of the present invention with some features shown in phantom to indicate that they are internal elements that would not normally be visible from a side plan view.

FIG. 3 shows a side plan view of the lens 100 with the recessed features 110a, 110b shown in phantom to indicate that they are internal elements that would not normally be visible from side view. The depth of the recessed features 110a, 110b in the y-direction can vary, depending on the specifications of the light emitters used and the emission characteristics in the z-direction, for example.

Figure 4:
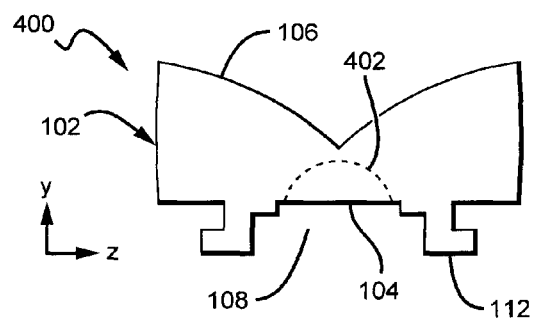
FIG. 4 is a cross-sectional view of a lens according to an embodiment of the present invention.

FIG. 4 shows a cross-sectional view of a lens 400 according to an embodiment of the present invention. The lens 400 is similar to the lens 100 in many respects and common features retain their reference numerals for convenience. The lens body 102 comprises receiving surface 104 and emission surface 106. The tunnel 108 is formed under the lens body 102 and runs along the longitudinal axis. In this particular embodiment, a hemispherical recessed feature 402 is shown in phantom as an internal feature that would not normally be visible in the plane of this cross-section. As discussed in more detail below, the recessed features may have many different shapes based on the desired output profile and the intended function of the feature, among other factors. The shape of the lens body 102 at the emission surface is designed to spread incident light to the sides (i.e., in the x-direction) to give a uniform lateral distribution. Other lens shapes may be used depending on the desired output profile.

Figure 5A:
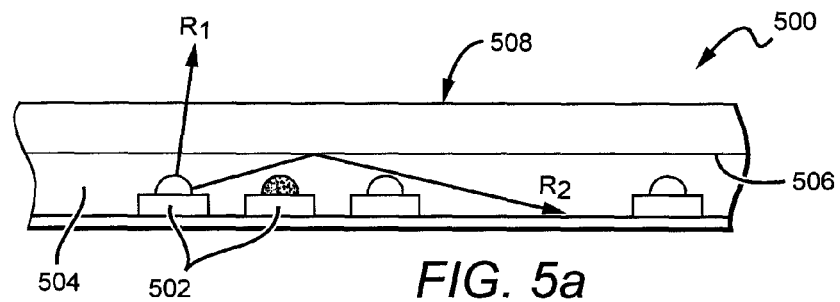
FIGS. 5a and 5b are schematic views along a cross-section of lenses according to embodiments of the present invention.
Figure 5B:
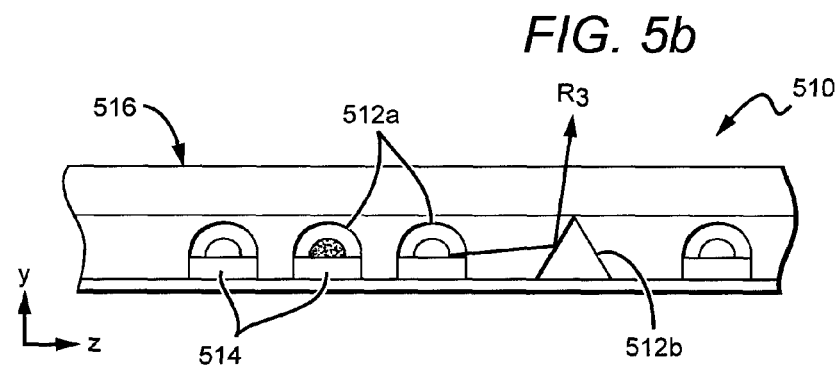

FIGS. 5a and 5b are schematic views along a cross-section of lenses 500, 510. These figures illustrate how the first and second type recessed features 502a, 502b function as reverse TIR elements to improve output uniformity and efficiency.

The embodiment shown in FIG. 5a does not include any recessed features. The LEDs are disposed within the tunnel 504. As shown, light ray $R_1$ impinges a receiving surface 506 at an angle that is great enough to pass into the lens body 508 and eventually out into the ambient. Light ray $R_2$, on the other hand, impinges the receiving surface 506 at a much smaller angle and is reflected along the longitudinal direction. Light travelling along this longitudinal path may bounce around internally and ultimately be absorbed by an internal element or an LED, for example. Light that gets absorbed cannot be emitted as useful light, decreasing the efficiency of the system.

The embodiment shown in FIG. 5b shows the lens 510 which does include the recessed features 512. The first type recessed features 512a have a rounded shape designed to couple the LEDs 514 as completely as possible into the lens body 516. Some light is emitted at low angles from the LED 514, illustrated by light ray $R_3$. Light ray R3 initially travels along the longitudinal direction. It may be absorbed at the end of the lens, such as by an endcap, or it may travel back into the tunnel areas where it can be absorbed by internal elements, such as an LED. In any case, there is a chance that light ray $R_3$ will be absorbed and, thus, fail to contribute to the luminous output. The second type recessed feature 512b is disposed along the longitudinal path in between consecutive LED clusters. The feature 512b is shaped to redirect light traveling along the longitudinal direction (e.g., light ray $R_3$) into the lens body 516 where it can be emitted as useful light. Thus, the second type recessed feature 512b reduces light absorption. In this particular embodiment, a single triangular-shaped second type recessed feature 512b is disposed between consecutive LED clusters. In other embodiments, additional second type recessed features can be positioned in series.

Figure 6:
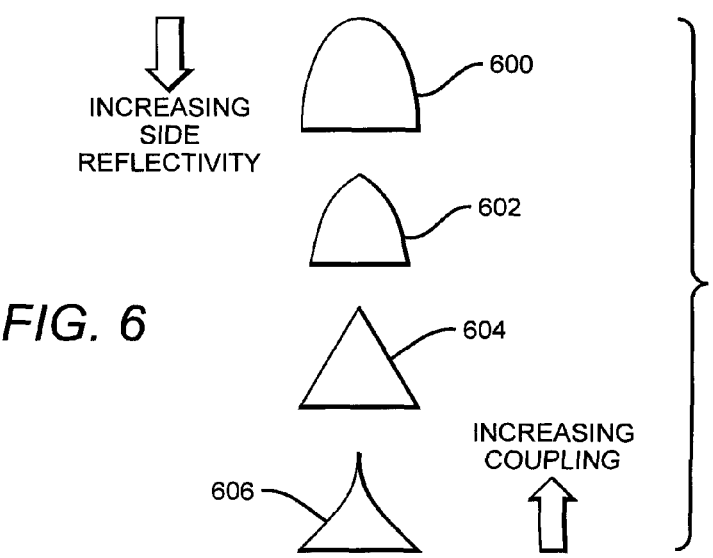
FIG. 6 includes cross-sectional views of four different shapes of recessed features that may be used in lenses according to embodiments of the present invention.

FIG. 6 shows cross-sectional views of four different shapes of recessed features that may be used in lenses according to embodiments of the present invention. The shapes represent cross-sections of the recessed features in the y-z-plane. Recessed feature 600 has a rounded, almost hemispherical shape. This shape is designed to couple hard into the medium so that most of the light emitted from within the recess will pass directly into the surrounding lens medium. Recessed feature 602 has a hybrid rounded triangular shape. This shape performs two functions. It will couple light emitted within the recess into the lens, and it will also redirect some light impinging from outside the recess away from the longitudinal direction and toward the lens body. Recessed feature 604 does not couple as well into the surrounding lens, but provides better reflectivity of externally impinging light and spreads light more effectively in the longitudinal direction, reducing hot spots directly over the light emitter(s). Recessed feature 606 provides the best reflectivity of externally impinging light, but couples into the lens least effectively. It is understood that the shapes shown are meant to be exemplary. Many different recessed feature shapes may be used to provide the desired coupling/reflective characteristic.

Many industrial, commercial, and residential applications call for white light sources. Light emitting units according to the present invention may comprise one or more emitters producing the same color of light or different colors of light. In one embodiment, a multicolor source is used to produce white light. Several colored light combinations will yield white light. For example, it is known in the art to combine light from a blue LED with wavelength-converted yellow (blue-shifted-yellow or BSY) light to yield white light with correlated color temperature (CCT) in the range from 5000K to 7000K (often designated as "cool white"). Both blue and BSY light can be generated with a blue emitter by surrounding the emitter with phosphors that are optically responsive to the blue light. When excited, the phosphors emit yellow light which then combines with the blue light to make white. In this scheme, because the blue light is emitted in a narrow spectral range it is called saturated light. The BSY light is emitted in a much broader spectral range and, thus, is called unsaturated light.

Another example of generating white light with a multicolor source is combining the light from green or blue-shifted-green (BSG) and red LEDs. RGB schemes may also be used to generate various colors of light. In some applications, an amber emitter is added for an RGBA combination. The previous combinations are exemplary; it is understood that many different color combinations may be used in embodiments of the present invention. Several of these possible color combinations are discussed in detail in U.S. Pat. No. 7,213,940 to Van de Ven et al., which is commonly assigned with the present application to CREE, INC.

FIGS. 7a-e show top plan views of several lighting strips 700, 710, 720, 730, 740 that may be used in light emitting units according to embodiments of the present invention. The lighting strips 700, 710, 720, 730, 740 each depict possible LED combinations that result in an output spectrum that can be mixed to generate white light. Each lighting strip can include the electronics and interconnections necessary to power the LEDs. In some embodiments the lighting strip comprises a printed circuit board with the LEDs mounted and interconnected thereon. The lighting strip 700 includes clusters 702 of discrete LEDs, with each LED within the cluster 702 spaced a distance from the next LED, and each cluster 702 spaced a distance from the next cluster 702. If the LEDs within a cluster are spaced at too great distance from one another, the colors of the individual sources may become visible, causing unwanted color-striping. In some embodiments, an acceptable range of distances for separating consecutive LEDs within a cluster is not more than approximately 8 mm.

Figure 7A:
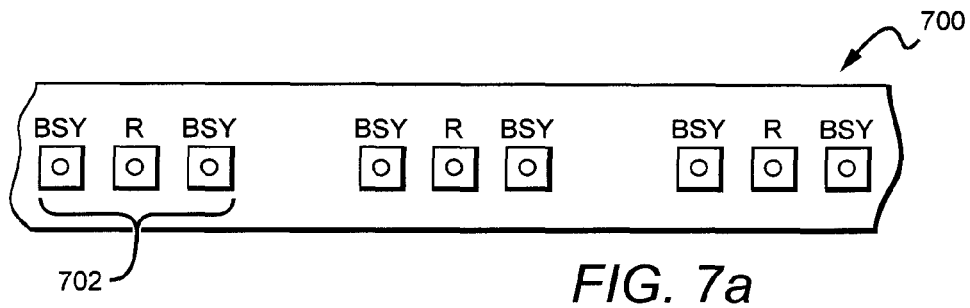
FIGS. 7a-e are top plan views of several lighting strips that may be used in light emitting units according to embodiments of the present invention.
Figure 7B:
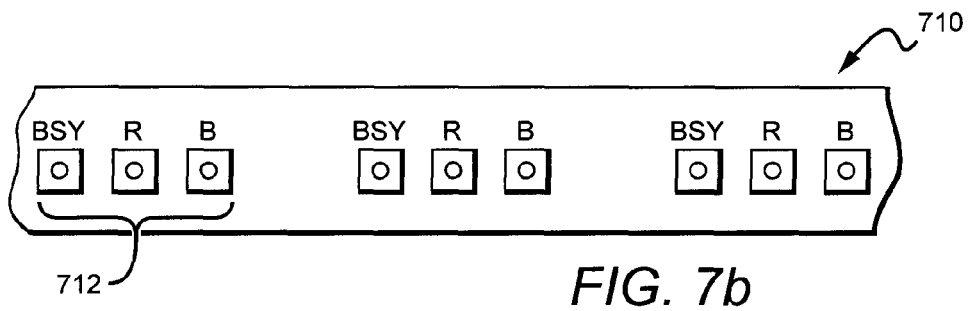
Figure 7C:
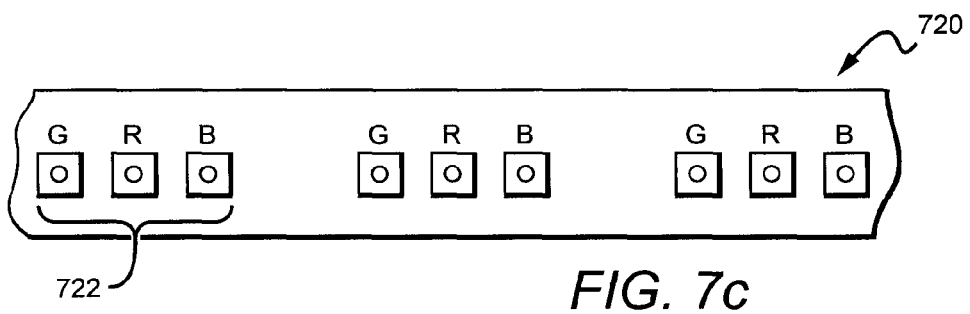
Figure 7D:
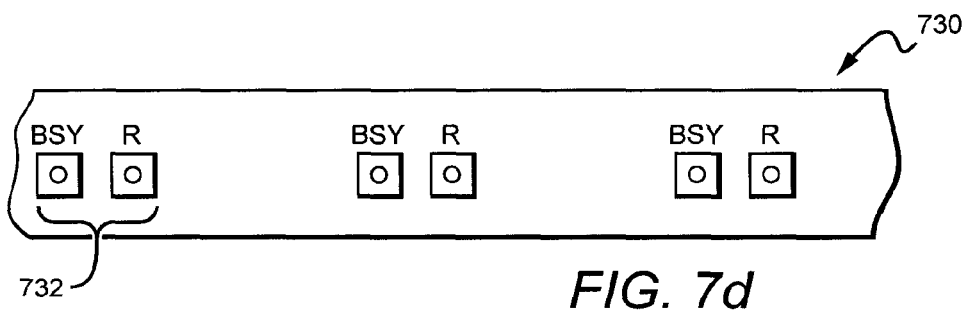
Figure 7E:
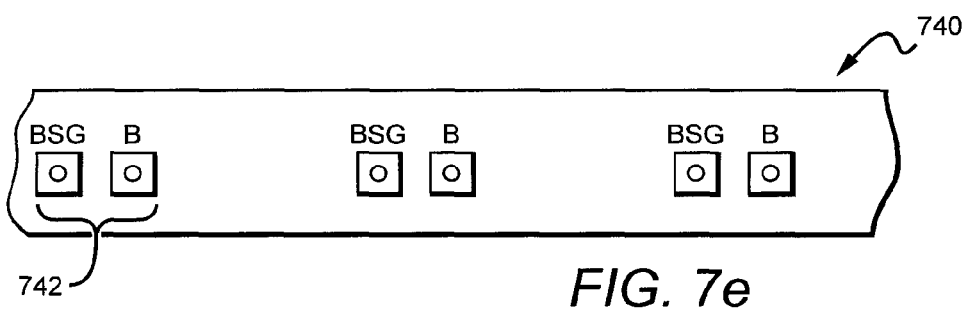

The scheme shown in FIG. 7a uses a series of clusters 702 having two blue-shifted-yellow LEDs ("BSY") LEDs and a single red LED ("R"). Once properly mixed the resultant output light will have a warm white appearance.

The lighting strip 710 includes clusters 712 of discrete LEDs. The scheme shown in FIG. 7b uses a series of clusters 712 having a BSY LED, a red LED, and a blue ("B") LED. This scheme will also yield a warm white output when sufficiently mixed.

The lighting strip 720 includes clusters 722 of discrete LEDs. The scheme shown in FIG. 7c uses a series of clusters 722 having one green LED ("G"), one red LED, and one blue LED.

The lighting strip 730 includes clusters 732 of discrete LEDs. The scheme shown in FIG. 7d uses a series of clusters 732 having one BSY LED and one red LED.

The lighting strip 740 includes clusters 742 of discrete LEDs. The scheme shown in FIG. 7e uses a series of clusters 742 having one blue-shifted-green ("BSG") LED and one red LED.

The lighting schemes shown in FIGS. 7a-e are meant to be exemplary. Thus, it is understood that many different LED combinations can be used in concert with known conversion techniques to generate a desired output light color.

Figure 8A:
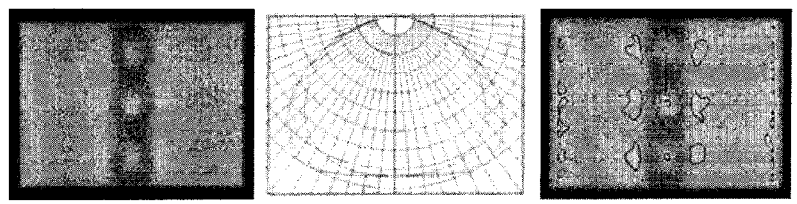
FIGS. 8a and 8b show simulations of light emitting units without any recessed features.
Figure 8B:
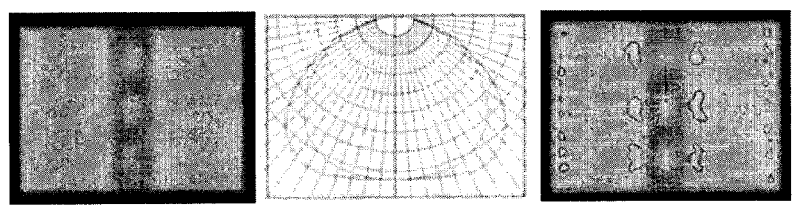
Figure 8C:
FIGS. 8c-e show simulations of light emitting units according to embodiments of the present invention.
Figure 8C:
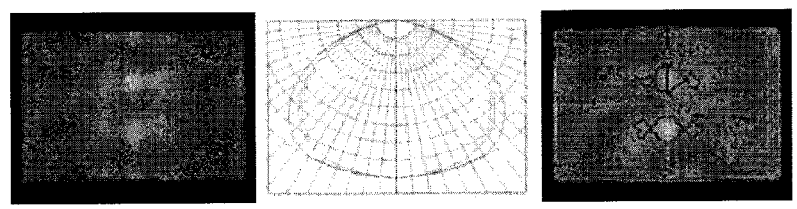
Figure 8D:
Figure 8D:
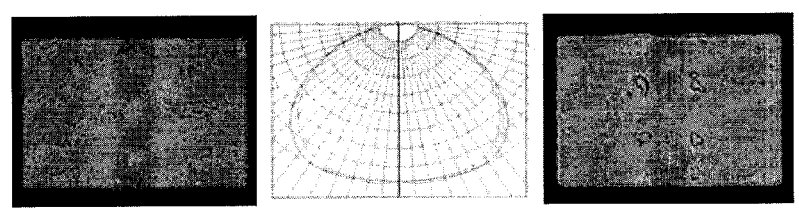
Figure 8E:
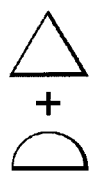
Figure 8E:
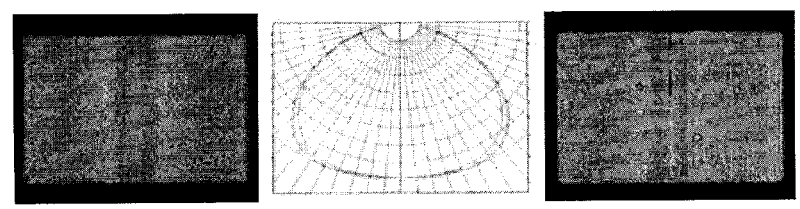

FIGS. 8a-e show five simulations of light emitting units. FIGS. 8a and 8b show simulations of light emitting units without any recessed features. FIGS. 8c-e show simulations of light emitting units according to embodiments of the present invention. The first figure in each set shows an image of the output of an emitter unit from the emission surface side. The second figure is a polar graph of the output with various wavelengths shown. The third figure is an image of the emitter unit output with areas of high contrast indicated. The emitter units simulated in FIGS. 8c-e comprise a lens similar to the lens shown in FIG. 1 with each of the simulations built to model the output using a different recessed feature design. Each simulated emitter unit comprises a ZDF diffuser.

The simulations were done using the Photopia, which is a software program that models optical systems. This tool has proven to be reliable in the production of high quality models that correlate closely with actual products subsequently built and tested. Thus, models produced using the simulations created using the Photopia tool can be relied upon to accurately predict the behavior of the lens elements in the physical world.

In FIGS. 8a and 8b emitter units without recessed features were simulated. The LED clusters in FIG. 8a were spaced at intervals of 8 mm along the longitudinal direction of the lens body. In FIG. 8b, they are spaced at 5 mm intervals. Both figures show clearly visible hotspots along the spine of the lens body. The corresponding polar plots indicate that there is a noticeable color spread in the middle range of viewing angles. The contrast images show the hotspots which are outlined for emphasis. Some noticeable hotspots appear along the spine and in the regions adjacent to the emitter clusters outside the lens. The ratios of maximum to minimum surface luminance were 2.63 (8 mm) and 2.86 (5 mm). The ratios of average to minimum surface luminance were 1.89 (8 mm) and 1.98 (5 mm).

In FIG. 8c an emitter unit according to an embodiment of the present invention was simulated. This particular emitter unit comprises only recessed features having a triangular cross-sectional shape. The recessed features are spaced at intervals of 5 mm along the longitudinal direction of the lens body. As shown, the triangular recessed features provide good middle-to-side uniformity and spread the light well between the LED clusters; however, there are clear hotspots between the clusters along the longitudinal direction with dark spots directly above the LED clusters. The efficiency of the unit was 73.8%. The polar plot indicates that there is some color spread in the middle range of the viewing angles. The contrast image shows the hotspots which are outlined for emphasis. Some noticeable hotspots appear along the spine and in the regions adjacent to the emitter clusters outside the lens. The ratio of maximum to minimum surface luminance was 3.95. The ratio of average to minimum surface luminance was 1.62.

In FIG. 8d an emitter unit according to an embodiment of the present invention was simulated. This particular emitter unit comprises only recessed features having a hemispherical cross-sectional shape. The recessed features are spaced at intervals of 5 mm along the longitudinal direction of the lens body. As shown, the hemispherical recessed features provide better side uniformity and couple well into the lens above the LED clusters; however, there are hotspots above the clusters and dark spots between the clusters along the longitudinal direction. This is the opposite effect of that observed when using only the triangular recessed features as shown in FIG. 8c. The efficiency of the unit was 78.4%, which is to be expected as the hemispherical shape of the recessed features couples light from the emitters into the lens well. The polar plot indicates that there is still some color spread in the middle range of the viewing angles, but less than with the triangular features. The contrast image shows some high contrast areas in the region adjacent to the lens. The ratio of maximum to minimum surface luminance was 2.17. The ratio of average to minimum surface luminance was 1.53.

In FIG. 8e an emitter unit according to an embodiment of the present invention was simulated. This particular emitter unit comprises both recessed features having a hemispherical cross-sectional shape and recessed features having a triangular cross-sectional shape. The hemispherical shaped recessed features correspond with the placement of the light emitters along the spine. The recessed features having a triangular shape are disposed between the emitter clusters along the spine. The recessed features are spaced at intervals of 8 mm along the longitudinal direction of the lens body. As shown, this combination of recessed features provides good side uniformity with a relatively uniform output along the spine. The efficiency of the unit was 76.0. The polar plot indicates that the best color uniformity of the three simulations over the entire viewing angle range. The contrast image shows few high contrast areas in the region adjacent to the lens. The ratio of maximum to minimum surface luminance was 2.03. The ratio of average to minimum surface luminance was 1.42.

Of the five simulated light emitter units, the hybrid hemisphere/triangle recessed feature arrangement provided the best contrast and color uniformity. This result was expected as the favorable characteristics of the different shapes of recessed features provide both good coupling and reflection as discussed herein with respect to FIG. 6. In general, the rounded features spread the light well into areas above the clusters, while the triangular shaped features spread the light well into areas between the clusters.

If the clusters are spaced farther apart it may be advantageous to use more triangular features, even if disposed directly above the clusters. This arrangement will spread light more effectively along the longitudinal direction and will improve color mixing as well. Several different recessed feature combinations are possible to achieve a particular output profile.

Many different additional light mixing elements can be used in conjunction with the lenses described herein to improve color uniformity and spatial uniformity in the output profile. As discussed, the light emitters can be the same color or different colors. When multiple emitters are used, it is desirable to blend the output of the individual emitters so that it appears that the light is coming from a single "virtual" source. This can be done in various ways.

For example, in some embodiments an index matching material can be used between the emitters and the receiving surface of the lens body to ease transition between the two materials which may have significantly different refractive indices. Index matching materials are typically viscous curable fluids, such as epoxies for example, that can be coated onto a surface or injected into a cavity between two surfaces. Once cured, the material provides an intermediate step up/down in refractive index as the light passes from a first medium through the index matching material and into a second medium. Many different known index matching materials may be used.

In other embodiments, in order to provide additional light mixing, a diffuser may be used. The diffuser can be disposed on any surface of the lens or within the lens. Diffusers may comprise a plurality of surface structures, or, in another embodiment, diffusers may comprise a volumetric film which is applied to the lens surface. In yet another embodiment, the diffuser can be dispersed volumetrically throughout the lens body itself.

Incident light that impinges the diffuser on a lens surface can be refracted to give a desired spread inside the lens. Diffusers having different specifications can be used to achieve a particular angular distribution. The specifications of the diffuser may be chosen such that the light entering the lens is directed toward various emission surfaces. It is understood that many different types of diffusive agents may be used on or within the lens body.

Additionally, any of the receiving or emission surfaces can be textured or otherwise modified to provide a desired effect in the output profile.

Figure 9:
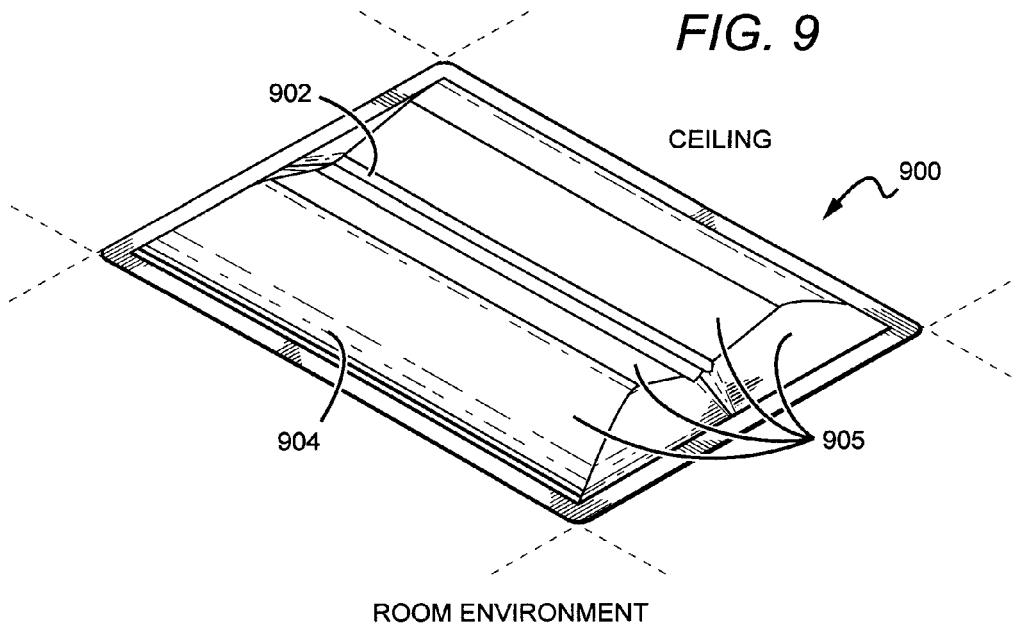
FIG. 9 is a perspective view from the bottom side of a troffer-style fixture according to an embodiment of the present invention.

FIG. 9 is a perspective view from the bottom side of a troffer-style fixture (troffer) 900 according to an embodiment of the present invention. The troffer 900 comprises an elongated light emitting unit 902 which fits within a reflective pan 904 that surrounds the perimeter of the light emitting unit 902. The pan 904 comprises several inner reflective surfaces 905. The troffer 900 may be suspended or fit-mounted within a ceiling. The view of the troffer 900 in FIG. 9 is from an area underneath the troffer 900, i.e., the area that would be lit by the light emitters housed within the troffer 900. It is understood that any of the elongated light emitting units described herein may be used in the troffer 900.

Figure 10:
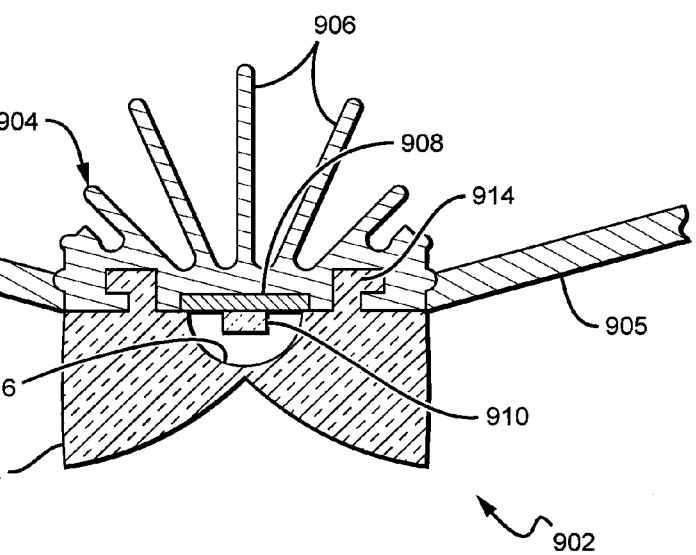
FIG. 10 is a close-up cross-sectional view of a portion of a troffer-style fixture according to an embodiment of the present invention.

FIG. 10 is a close-up cross-sectional view of a portion of the troffer 900. The light emitting unit 902 is attached to a heat sink 904 which comprises fin structures 906 on the top side (i.e., the side facing away from the emission direction). Although it is understood that many different heat sink structures may be used. The bottom side portion of the heat sink 904 which faces the room comprises a mount surface 908. The mount surface 908 provides a substantially flat area on which light sources such as LED 910, for example, can be mounted. In some embodiments, the multiple light sources will be pre-mounted on light strips as shown in FIGS. 7a-e. These figures show a top plan view of portions of several light strips that may be used to mount multiple LEDs to the mount surface 908. Although LEDs are used as the light sources in various embodiments described herein, it is understood that other light sources, such as laser diodes for example, may be substituted in as the light sources in other embodiments of the present invention.

An elongated lens 912, similar to lens 100, is mounted proximate to the light sources. As shown, this particular embodiment includes tabs 914 that cooperate with the heat sink 904 for convenient mounting. This particular cross-sectional view shows a hemispherical recessed feature 916 over the LED 910. It is understood that other recessed features are disposed along the longitudinal spine of the light emitting unit 902, according to various embodiments described herein.

Additionally, it is understood that the troffer-style fixture shown in FIGS. 9 and 10 is meant to be an example of one type of fixture that may be used with embodiments of the light emitting units and lenses disclosed herein. There are many different types and shapes of fixtures, troffer-style or otherwise, that can accommodate these light emitting units and lenses, allowing them to be installed and operated in residential, industrial, commercial, and other classifications of spaces.

It is understood that embodiments presented herein are meant to be exemplary. Embodiments of the present invention can comprise any combination of compatible features shown in the various figures, and these embodiments should not be limited to those expressly illustrated and discussed. Although the present invention has been described in detail with reference to certain preferred configurations thereof, other versions are possible. Therefore, the spirit and scope of the invention should not be limited to the versions described above.

We claim:

1. A lens, comprising:
an elongated body comprising at least one receiving surface and at least one emission surface, said receiving surface comprising a plurality of recessed features along a longitudinal axis of said body, said plurality of recessed features comprising at least two different shapes; and
wherein said plurality of recessed features improves light output efficiency.

2. The lens of claim 1, said body further comprising a volumetric diffusive material.

3. The lens of claim 1, further comprising a diffusive material on at least a portion of said at least one emission surface.

4. A lens, comprising:
an elongated body comprising at least one receiving surface and at least one emission surface, said receiving surface comprising at least one recessed feature along a longitudinal axis of said body;
said at least one recessed feature comprising a plurality of recessed features along a longitudinal axis of said body, said plurality of recessed features comprising at least two different shapes; and
wherein said recessed features are at even intervals along the longitudinal axis of said body.

5. A lens, comprising:
an elongated body comprising at least one receiving surface and at least one emission surface, said receiving surface comprising at least one recessed feature along a longitudinal axis of said body;
said at least one recessed feature comprising a plurality of recessed features along a longitudinal axis of said body; and
said plurality of recessed features comprising a first type of recessed feature comprising a longitudinal cross-section with two rounded edges that meet at a vertex and a second type of recessed feature comprising a triangular longitudinal cross-section.

6. The lens of claim 5, wherein said first type recessed features are in clusters along the longitudinal axis of said body with at least one of said second type recessed features along the longitudinal axis between consecutive of said clusters.

7. The lens of claim 5, wherein said first type recessed features are in clusters along the longitudinal axis of said body with a plurality of said second type recessed features along the longitudinal axis between consecutive of said clusters.

8. A lens, comprising:
an elongated body comprising at least one receiving surface and at least one emission surface, said receiving surface comprising a plurality of recessed features along a longitudinal axis of said body, said plurality of recessed features comprising at least two different shapes; and
wherein at least a portion of said at least one emission surface is textured.

9. A light emitting unit, comprising:
a plurality of light emitters;
an elongated lens comprising at least one receiving surface and at least one emission surface, said elongated lens comprising at least two recessed features along a longitudinal axis of said lens, said at least two recessed features comprising at least two different shapes;
wherein said light emitters are proximate to said receiving surface; and
wherein each of said light emitters is aligned with one of said recessed features.

10. The light emitting unit of claim 9, wherein said light emitters at least partially protrude into a space defined by said recessed features.

11. The light emitting unit of claim 9, said plurality of recessed features comprising a first type of recessed feature having a first shape and a second type of recessed feature having a second shape.

12. The light emitting unit of claim 9, wherein said light emitters are in emitter clusters along said longitudinal axis.

13. The light emitting unit of claim 12, wherein each of said emitter clusters comprises a blue-shifted yellow emitter and a red emitter.

14. The light emitting unit of claim 12, wherein each of said emitter clusters comprises a blue-shifted yellow emitter, a red emitter, and a blue emitter.

15. The light emitting unit of claim 12, wherein each of said emitter clusters comprises a green emitter, a red emitter, and a blue emitter.

16. The light emitting unit of claim 12, wherein each of said emitter clusters comprises a blue-shifted green emitter and a red emitter.

17. The light emitting unit of claim 12, wherein each of said emitter clusters comprises two blue-shifted yellow emitters and one red emitter.

18. The light emitting unit of claim 9, said lens further comprising a volumetric diffusive material.

19. The light emitting unit of claim 9, said lens further comprising a diffusive material on at least a portion of said at least one emission surface.

20. A light emitting unit, comprising:
a plurality of light emitters;
an elongated lens comprising at least one receiving surface and at least one emission surface, said receiving surface comprising at least two recessed features along a longitudinal axis of said lens, said at least two recessed features comprising at least two different shapes;
wherein said light emitters are proximate to said receiving surface; and
wherein said recessed features are at even intervals along the longitudinal axis of said lens.

21. A light emitting unit, comprising:
a plurality of light emitters;
an elongated lens comprising at least one receiving surface and at least one emission surface, said elongated lens comprising at least two recessed features along a longitudinal axis of said lens;
wherein said light emitters are proximate to said receiving surface;
said plurality of recessed features comprising a first type of recessed feature having a first shape and a second type of recessed feature having a second shape; and wherein said first shape is defined by a longitudinal cross-section with two rounded edges that meet at a vertex, and said second shape is defined by a triangular longitudinal cross-section.

22. The light emitting unit of claim 21, wherein said second type recessed features have increasing depth moving away from the sides toward the center of the recessed feature.

23. A light emitting unit, comprising:
a plurality of light emitters;
an elongated lens comprising at least one receiving surface and at least one emission surface, said elongated lens comprising at least two recessed features along a longitudinal axis of said lens;
wherein said light emitters are proximate to said receiving surface;
said plurality of recessed features comprising a first type of recessed feature having a first shape and a second type of recessed feature having a second shape;
wherein said first type recessed features are in clusters along the longitudinal axis of said body with at least one of said second type recessed features along the longitudinal axis between consecutive of said clusters; and
wherein said light emitters are in a plurality of emitter clusters and said emitter clusters cooperate with said first type recessed feature clusters.

24. A light emitting unit, comprising:
a plurality of light emitters;
an elongated lens comprising at least one receiving surface and at least one emission surface, said receiving surface comprising at least two recessed features along a longitudinal axis of said lens, said at least two recessed features comprising at least two different shapes;
wherein said light emitters are proximate to said receiving surface; and
wherein at least a portion of said at least one emission surface is textured.

25. A lighting unit, comprising:
a troffer-style fixture;
an elongated lens body comprising at least one receiving surface, at least one emission surface, and a plurality of recessed features along a longitudinal axis of said body, said plurality of recessed features comprising at least two different shapes; and
a plurality of light emitters proximate to said receiving surface; and
wherein said plurality of recessed features improves light output efficiency.

26. The light emitting unit of claim 25, wherein each of said light emitters is aligned with one of said recessed features.

27. The light emitting unit of claim 25, wherein said light emitters at least partially protrude into a space defined by said recessed features.

28. The light emitting unit of claim 25, said plurality of recessed features comprising a first type of recessed feature comprising a first shape and a second type of recessed feature having a second shape.

29. A lighting unit, comprising:
a troffer-style fixture;
an elongated lens body comprising at least one receiving surface, at least one emission surface, and a plurality of recessed features along a longitudinal axis of said body, said plurality of recessed features comprising at least two different shapes;
a plurality of light emitters proximate to said receiving surface; and
wherein said plurality of recessed features are at even intervals along the longitudinal axis of said lens body.

* * * * *